May 13, 1924.
A. M. CRAMER
LIQUID CIRCULATING MECHANISM
Filed Jan. 24, 1922
1,494,102
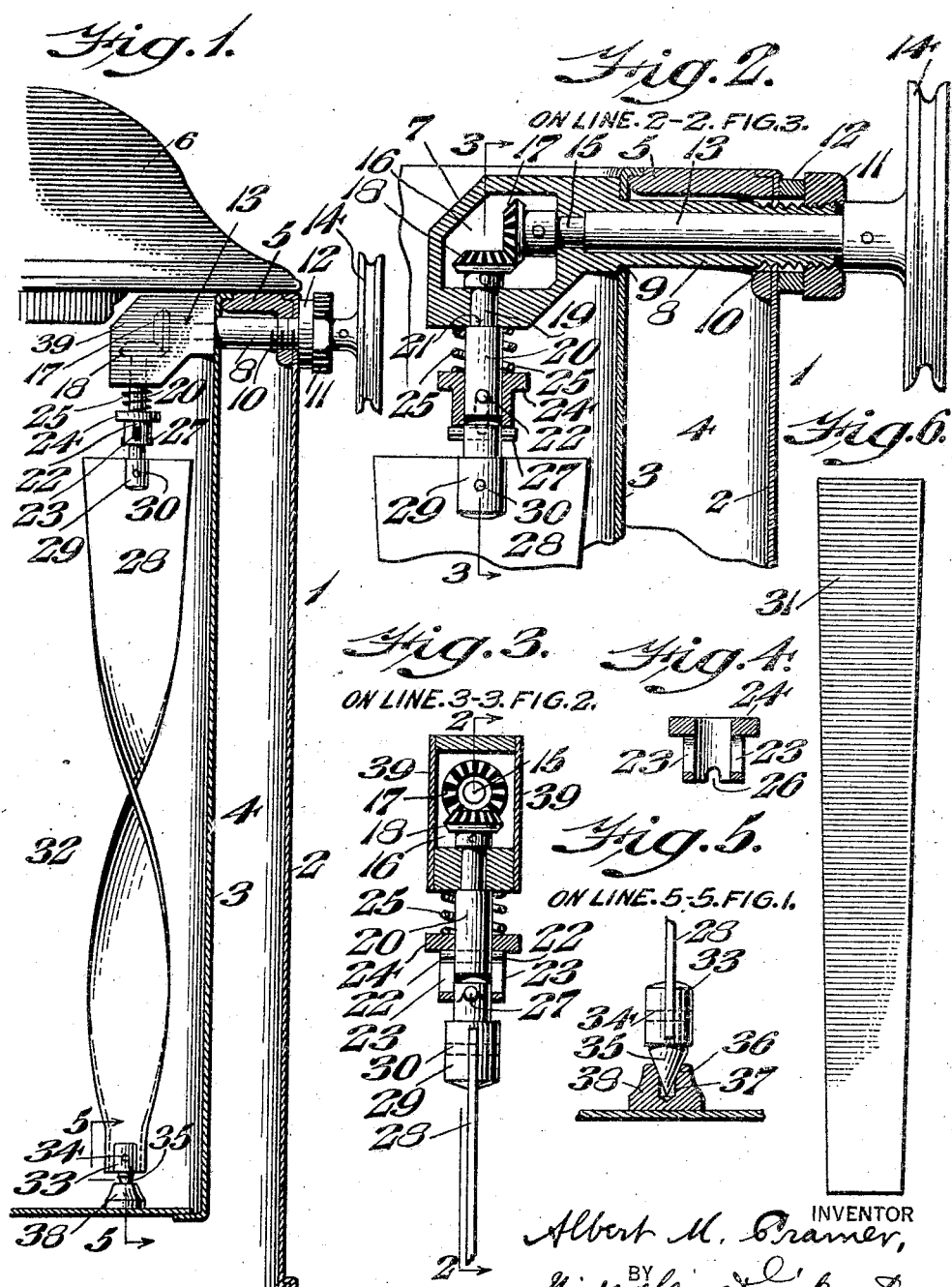

Patented May 13, 1924.

1,494,102

UNITED STATES PATENT OFFICE.

ALBERT M. CRAMER, OF PHILADELPHIA, PENNSYLVANIA, ASSIGNOR TO HORN AND HARDART COMPANY, OF NEW YORK, N. Y., A CORPORATION OF NEW YORK.

LIQUID-CIRCULATING MECHANISM.

Application filed January 24, 1922. Serial No. 531,505.

*To all whom it may concern:*

Be it known that I, ALBERT M. CRAMER, a citizen of the United States, residing at Philadelphia, county of Philadelphia, State of Pennsylvania, have invented a new and useful Liquid-Circulating Mechanism, of which the following is a specification.

In the vending of liquids such as milk, cocoa and chocolate, for example, considerable difficulty has been experienced in maintaining the liquid being vended of a uniform consistency. If, for example, milk is to be vended, the cream, as is well known, rises to the top and as the milk is ordinarily drawn off from the bottom of the container in which it is placed, the milk from the bottom of the container will be more on the order of skimmed milk and the last portion of the milk drawn from the container will be more on the order of cream.

If chocolate is to be vended the fatty particles, as is well known, rise to the top of the container so that the chocolate being vended will not be of the proper uniform consistency.

Many different constructions have been employed in the form of agitators but these have been impractical and have not produced the desired result, since, if they are employed for a considerable period of time, the milk is agitated to such an extent that butter fat forms, and in the case of chocolate the fatty globules and particles are not properly mixed.

A further difficulty arises in vending machines of the coin controlled type, since in this class of machines it is customary to withdraw from the main container a measured quantity of liquid prior to the delivery of it into the glass or cup accessible to the purchaser, and, in order to obtain the proper results, the circulation must take place prior to the withdrawal from the main container of such measured quantity of liquid.

With the above and other objects in view which will hereinafter more clearly appear in the detailed description, my invention comprehends a novel construction and arrangement of liquid circulating mechanism.

It further comprehends a novel construction of liquid circulating mechanism which can be readily employed in conjunction with urns or containers having an open and unobstructed top through which they can be filled and wherein the portion of the circulating mechanism which comes into contact with the liquid can be readily removed without the aid of any tools, so that not only the container and its adjuncts but the liquid circulating mechanism as well can be at all times maintained in a sanitary condition.

It further comprehends a novel construction of a circulating blade and a novel manner of mounting it.

It further comprehends a novel construction of a circulating member formed by twisting a flat piece of stock one end being mounted within the liquid and the other end being resiliently held and maintained in assembled position.

Other novel features of construction and advantage will hereinafter more clearly appear in the detailed description.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in sectional elevation, an urn in conjunction with which liquid circulating mechanism embodying my invention is employed.

Figure 2 represents a section on line 2—2 of Figure 3.

Figure 3 represents a section on line 3—3 of Figure 2.

Figure 4 represents, in sectional elevation and in detached position, a coupling sleeve employed.

Figure 5 represents a section on line 5—5 of Figure 1.

Figure 6 represents, in front elevation, a blank from which the circulating blade is formed.

Similar numerals of reference indicate corresponding parts.

Referring to the drawings.

1 designates a dispensing urn or container of any desired or conventional type. These urns in practice are in the form of a double walled container which consists of an outer container 2 and an inner container 3 which are spaced from each other so that a chamber 4 is formed adapted to receive insulating material of any desired nature or a temperature changing medium which varies in accordance with the character of the liquid which is to be dispensed. If the liquids are to be dispensed in a heated form this chamber 4 contains hot water or other desired medium and if the liquid to be dispensed is to be maintained in a cooled condition then this insulating chamber will contain a cooling medium such as, for example, brine or ice water.

The inner and outer containers are connected at their upper ends by means of an annular ring 5 secured thereto in any desired manner. The top of the urn is open and unobstructed and inclosed by means of a cover 6. If the dispensing of the liquid from the urn is to be coin controlled a coin controlled liquid measuring and discharge mechanism is employed such as, for example, as illustrated and described in the Fritche application Serial No. 324,154, filed Sept. 16, 1919, and my present invention is particularly adapted to be employed in conjunction with such type of urn which is now in extensive use in automatic restaurants.

Referring now more particularly to the liquid circulating mechanism, per se, embodying my invention, 7 designates a journal block having extending from it a sleeve 8 which forms with the body portion of the journal block a shoulder 9. This sleeve 8 extends through the wall of the urn near its top, the shoulder 9 abutting against the wall of the inner container and the sleeve 8 passing through a flange of the ring 5 and through the wall of the outer container and being provided with a threaded portion 10 which receives the nut 11 which bears against the washer 12 to secure the journal block 7 and its adjuncts in assembled position with respect to the urn.

13 designates a shaft journalled in the block 7 and the sleeve 8 and the outer end of this shaft is adapted to be connected with any desired source of power and for this purpose is illustrated as being provided with a pulley 14. The shaft 13 is provided with a reduced extension 16 which extends into a chamber 16 in the journal box 7 and fixed to such extension is a gear 17. The gear 17 meshes with a gear 18 also located in the chamber 16 and fixed to the reduced neck 19 of a shaft 20. The neck 19 is journalled in the journal box 7 and the shoulder 21 formed by the reduced neck contributes with the gear 18 to maintain the shaft 20 in assembled position with respect to the journal block 7. 22 designates a pin which extends through the lower end of the shaft 20 and into the slot 23 of a coupling sleeve 24, which is preferably of differential diameter as to its outer periphery.

A spring 25 is interposed between the journal block 7 and the coupling sleeve 24 so that the tendency of this spring is to move the coupling sleeve 24 downwardly. The coupling sleeve 24 at its inner or lower end is provided with the open cuts or recesses 26 into which are adapted to extend the ends of the pins 27 in order to secure the liquid circulating blade 28 in assembled position. This blade 28 at its upper end is secured in the bifurcated end of a rod 29 by soldering, spot welding or by means of a pin 30. The upper end of this rod has a working fit in the coupling sleeve 24. The liquid circulating member 28 is formed from at flat blank 31, see Figure 6, the opposite side walls of which converge downwardly. This blank is preferably formed from sheet metal and in order to form the liquid circulating member has a twist imparted to it, the number of turns of which will depend upon the height of the chamber 32 of the urn in which it is placed. The lower end of the liquid circulating member or blade 28 is received in a slit in a lower bearing member 33 and secured therein in any desired manner as by soldering or spot welding or by means of a pin 34.

The lower end of the member 33 is preferably cone-shaped, as indicated at 35, and engages the cone shaped wall 36 of an aperture 37 in a bearing member 38 which is secured to the bottom of the urn within the chamber 32 in any desired manner, for example, by soldering or spot welding it into place.

In the operation of devices of this character as, for example, in automatic restaurants, a row of urns is preferably arranged to have the liquid therein simultaneously circulated, the power shaft, not shown, being operatively connected with all of the shafts 13. Assuming now that the shaft 13 is being driven, the shaft 20 intergeared with it will be rotated thereby imparting a comparatively slow rotation to the liquid circulating member 28. This causes the cream, for example, to be drawn from the top of the milk and gradually fed downwardly toward the bottom from which it slowly rises to the top so that the milk, for example, is maintained of a uniform consistency without any churning action on the milk, which would tend to separate the butter fat from the milk.

Special attention is directed to the fact that the liquid circulating blade 28 tapers downwardly so that the amount of feed imparted to the liquid gradually varies from the top to the bottom.

My present invention is adapted to be employed in any type of urn as its location can be varied so that it will not interfere with the measuring cups or their vents which are ordinarily placed within the urns.

Whenever it is desired to clean the urn or the liquid circulating member, the liquid circulating member can be readily removed by simply pressing upwardly on the coupling sleeve 24 to release the pin 27 whereupon the liquid circulating member can be readily removed, as is apparent. This circulating member is preferably plated for sanitary purposes. The journal box 7 is located above the liquid in the urn and in order that the gears will not come in contact with any of the liquid when it is being placed in the urn, the chamber 16 is closed by the side plates 39, see Figure 1, which are secured to the journal block 7 in any desired manner.

It will be seen that the edges of the circulating member are coincident with an imaginary cone having its axis of revolution the same as the axis of revolution of such liquid circulating member.

Special attention is directed to the novel construction of the circulating member which is constructed in such a manner that the greatest feed is at the upper or outer end of the circulating member and the feed gradually decreases as you approach the opposite end of such member. This is due to the converging opposite edges of the blades, the amount of twist imparted to the blades and the speed at which the blades are revolved.

My device is also especially adapted to be employed in conjunction with urns in which buttermilk is dispensed, although as is apparent, it may be employed to circulate any desired liquid in order that it may be of substantially constant consistency.

It will now be apparent that I have devised a novel and useful liquid circulating mechanism which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. A liquid circulating member comprising a flat strip of material twisted only intermediate its ends and gradually decreasing in width from one end to the other, and bearing members fixed to the ends of said strip.

2. The combination with a liquid container having a closed bottom with a bearing, of a liquid circulating member comprising a flat blade twisted at its central portion and having its axis of revolution the axis of an imaginary cone coincident with the edges of said blade, said blade at its lower end and narrowest portion having fixed to it a bearing member to cooperate with said bearing, an upper bearing member fixed to the widest end of said blade and means operatively connected with said upper bearing member to revolve said blade.

3. The combination with a liquid container having a closed bottom with a bearing, of a liquid circulating member vertically disposed and out of contact with the walls of said container and comprising a flat blade twisted at its central portion and having its axis of revolution the axis of an imaginary cone coincident with the edges of said blade, said blade at its lower end and narrowest portion having fixed to it a bearing member to cooperate with said bearing, an upper bearing member fixed to the widest end of said blade and means operatively connected with said upper bearing member to revolve said blade.

ALBERT M. CRAMER.

Witnesses:
H. S. FAIRBANKS,
C. D. McVAY.